(12) United States Patent
Chen et al.

(10) Patent No.: US 6,463,081 B1
(45) Date of Patent: Oct. 8, 2002

(54) METHOD AND APPARATUS FOR FAST ROTATION

(75) Inventors: Hongyi Chen; Zhiqiang Zeng, both of Beijing (CN)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/056,454

(22) Filed: Apr. 7, 1998

(51) Int. Cl.[7] ............................. H04J 3/02; H04J 3/04; G06E 17/10
(52) U.S. Cl. .................. 370/532; 370/537; 708/316
(58) Field of Search .................. 370/532, 203, 370/208, 215, 533, 537; 708/209, 316, 505, 521, 523, 631, 670, 807

(56) References Cited

U.S. PATENT DOCUMENTS

| | | | | |
|---|---|---|---|---|
| 5,214,654 A | * | 5/1993 | Oosawa | 371/21.1 |
| 5,226,125 A | * | 7/1993 | Balmer et al. | 395/325 |
| 5,239,654 A | * | 8/1993 | Ing-Simmons et al. | 395/800 |
| 5,355,462 A | * | 10/1994 | Rousseau et al. | 395/400 |
| 5,712,999 A | * | 1/1998 | Guttag et al. | 395/421.01 |

OTHER PUBLICATIONS

A. Ligtenberg et al., "A Single Chip Solution for an 8 by 8 Two Dimensional DCT", IEEE 1987, pp. 1128–1131.

* cited by examiner

*Primary Examiner*—Alpus H. Hsu
*Assistant Examiner*—Toan Nguyen
(74) *Attorney, Agent, or Firm*—J.C. Patents

(57) ABSTRACT

An apparatus and a method of fast rotation. A pipeline comprising a plurality of multiplexes a plurality of shifters to perform last rotation of data selected by the multiplexes, and a plurality of adders/subtracters is provided. A plurality sets of data is input to be filtered and selected by the multiplexes. Fast rotation is performed to the data selected by the multiplexes. A final computation is performed a set of resultant data is output through the adder/subtractors.

27 Claims, 2 Drawing Sheets

METHOD AND APPARATUS FOR FAST ROTATION

BACKGROUND OF THE INVENTION

1. Field of the Invention

The invention relates to a Very Large Scale Integration (VLSI) hardware structure. and more particular to a method and an apparatus for fast rotation, in which each rotation is performed by using only few shift-addition operation.

2. Description of the Related Art

Conventionally, the basic arithmetic of Digital Signal Processing (DSP) is a summation of multiplication performed by a multiplier. The arithmetic is called "multiplication-accumulation arithmetic". The disadvantages of this arithmetic are: 1) a large word width of resultant data is needed to guarantee the accuracy because of numerical sensitivity: and 2) a problem in system stability or robustness is caused, so that more digits are reserved for calculation. The consequence of the above two disadvantages are that the additional consumption of hardware for internal bus and storage.

Orthogonal Transform (OT) is an important content of DSP and has been broadly applied in data compression and analysis. It has been proved in mathematics that a very good robustness is obtained by employing Givens rotation sequence to perform OT. Givens rotation is a unit matrix based on planar rotation. Assuming that $G_n(k, l, \theta)$ is a Givens rotation, and $$G_n(k, l, \theta) = \begin{bmatrix} I_{k-1} & & & & \\ & \cos\theta & & -\sin\theta & \\ & & I_{l-k-1} & & \\ & \sin\theta & & \cos\theta & \\ & & & & I_{n-1} \end{bmatrix} \quad |\theta| \leq \pi$$

wherein (k, l) represents rotation for kth and lth columns and rows. The rotation is an orthogonal matrix, so that value of the rotation matrix or the vector is kept constant before and after rotation.

To perform the above Givens rotation, Cordic algorithm is conventionally adopted. In Cordic algorithm, simple "right shift-addition & subtraction" calculation is used for planar rotation with infinitesimal angle. Through reiteratively calculation such as multiplication, division, trigonometry, and hyperbolic functions, Cordic algorithm has been broadly applied in palmar calculators. However, since Cordic algorithm is much more complex than "multiplication-accumulation arithmetic", this kind of rotation arithmetic cannot be performed in OT for further application.

To solve the above problem, A. Lightenberg, et. al. have developed an image processing chip in which Givens rotator is adapted to perform a two-dimensional 8×8 discrete cosine transform (DCT). Yet, four multipliers are used to calculation the rotation.

SUMMARY OF THE INVENTION

It is therefore an object of the invention to provide a method and an apparatus for fast rotation for fast realization of Givens rotation. A fast rotator is developed in which each rotation with an arbitrary angle is performed by only one or few times of "shift-addition". The fast rotator can be cascaded in pipelines for high throughput. This fast rotator can be used as the arithmetic core for the new VLSI-DSP to perform various OT by Givens rotation sequences. Therefore, a very good robustness is obtained, and furthermore, the computing complexity for the fast rotator is comparable to the conventional "multiplication-accumulation arithmetic". By employing the fast rotator according to the invention as a computing kernel in digital image processing, especially in high definition television (HDTV) images and high resolution medical X-ray images, the total amount of image data can be transformed and reduced to an acceptable amount.

To achieve these objects and advantages, and in accordance with the purpose of to the invention, as embodied and broadly described herein, the invention is directed towards an apparatus of fast rotation, including, a plurality of pipelines. Each of the pipelines comprises: a plurality of multiplexes, for data filtering and selecting; a plurality of shifters, to perform fast rotation of data selected by the multiplexes; and a plurality of adders/subtractors, to complete computation after the fast rotation and to obtain a resultant data.

To achieve these objects and advantages, and in accordance with the purpose of the invention, as embodied and broadly described herein, the invention is directed toward a method of fast rotation. A pipeline comprising a plurality of multiplexes, a plurality of shifters, to perform fast rotation of data selected by the multiplexes, and a plurality of adders/subtractors is provided. A plurality sets of data is input to be filtered and selected by the multiplexes. Fast rotation is performed to the data selected by the multiplexes. A final computation is performed a set of resultant data is output through the adder/subtractors.

It is to be understood that both the foregoing general description and the following detailed description are exemplary and explanatory only and are not restrictive of the invention, as claimed.

DESCRIPTION OF THE PREFERRED EMBODIMENTS

Figure 1:
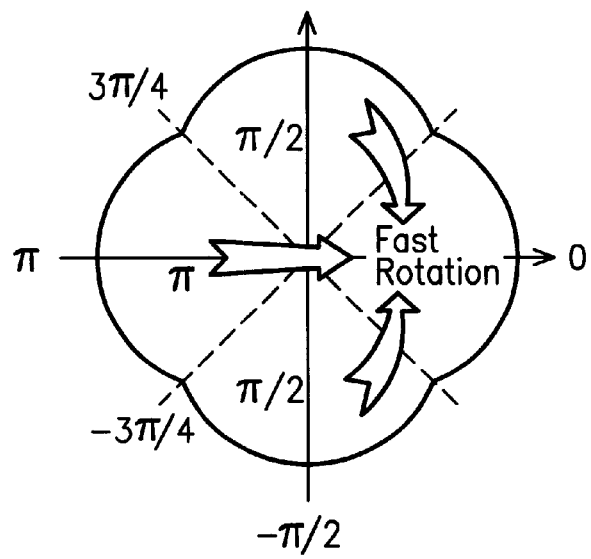
FIG. 1 shows a method of pre-rotating rotation range out of $-\pi/4 \sim \pi/4$ to a range therewithin in an embodiment according to the invention.

A method and an apparatus (a fast rotator) for fast realization of Givens rotation are developed in the invention. Compared to the conventional Cordic algorithm, the fast rotator greatly reduces the computing times of "shift-addition". Therefore, the computing complexity is reduced. On the other hand, the advantages of Givens rotation such as good system stability and robustness are maintained. A detailed description of the fast rotator is as follows. Algorithm Givens rotation is based on a planar rotation $G(\theta)$:

$$G(\theta) = \begin{bmatrix} \cos\theta & -\sin\theta \\ \sin\theta & \cos\theta \end{bmatrix} = \begin{bmatrix} c & -s \\ s & c \end{bmatrix}, \begin{cases} c = \cos\theta \\ s = \sin\theta \end{cases}$$

wherein $G(\theta)$ is also called as "atomic rotation". The planar rotation $G(\theta)$ is an orthogonal matrix, so that the length is kept constant during rotation.

$$\begin{bmatrix} x_{out} \\ y_{out} \end{bmatrix} = \begin{bmatrix} c & -s \\ s & c \end{bmatrix} \begin{bmatrix} x_{in} \\ y_{in} \end{bmatrix} \quad (1)$$

$$\begin{cases} x_{out} = cx_{in} - sy_{in} \\ y_{out} = cx_{in} + sy_{in} \end{cases}$$

$$\sqrt{x_{out}^2 + y_{out}^2} = \sqrt{x_{in}^2 + y_{in}^2}$$

Conventionally, four times of multiplication and two times of addition (subtraction) are needed. Using multiplication, the digits of data are multiplied. To approximate the data by truncating the digits, an error occurs to affect the system stability or robustness seriously. If Cordic algorithm is in use, a precise rotation requires many times of shift-addition infinitesimal rotation and scale factors. Therefore, the computing cost is much higher than the multiplication-accumulation arithmetic.

In the invention, a fast rotation is developed. The concept of the fast rotation is to use one or few shift-addition to approach a precise rotation.

The fast rotation matrix is defined as:

$$F(\hat{c}, \hat{s}) = \begin{bmatrix} \hat{c} & -\sigma\hat{s} \\ \hat{s} & \hat{c} \end{bmatrix} = \hat{m}G(\theta) \quad (2)$$

wherein $\sigma$ represents the rotation direction, and $\sigma=\pm 1$ for a counterclockwise rotation and a clockwise rotation, respectively. The parameter pair $(\hat{c},\hat{s})$ is a sine/cosine approach of $(\hat{c},\hat{s})$, respectively. $\hat{m}$ is a scale factor:

$$\hat{m} = \sqrt{\hat{c}^2 + \hat{s}^2} = 1 + \epsilon \quad (3)$$

For $\epsilon$ is sufficiently small, $F(\hat{c},\hat{s})$ can precisely represents $G(\theta)$. A sign-fraction format is used to represent the data:

$$-sign + \sum_{t=1}^{n_m} a_i 2^{-t},$$

wherein both–sign and $a_i$ are in a binary form. That is, the highest digit, sign, is a digit of sign, and the rest digits are decimals, which comprise $(n_m+1)$ digits. The condition "for $\epsilon$ is sufficiently small" means:

$$|\epsilon| < 2^{-(n_x+i)} \quad (4)$$

which is the orthogonal condition. The angle of fast rotation $\theta$ depends on the parameter pair $(\hat{c},\hat{s})$ and the rotation direction $\sigma$. The relationship therebetween is:

$$\theta = \sigma \cdot \alpha = \sigma \cdot tg^{-1}\left(\frac{\hat{s}}{\hat{c}}\right) \quad (5)$$

wherein $\alpha$ is the absolute angle of rotation restricted within the first quadrant.

There are many methods to meet the requirements and conditions of the above fast rotation:
1) Four methods of cosine/sine Taylor series expansion to perform rotation within $-\pi/4 \sim \pi/4$.
Method 1

$$\hat{c}=1, \hat{s}=2^k, \hat{m}=\sqrt{1+2^{2k}} \quad (6)$$

wherein k is the angle index of rotation (right shift digit), a non-positive integer. By replacing the (c,s) in equation (1) with the above data of $(\hat{c},\hat{s})$ fast rotation is performed with only two times of shift-addition. By inputting the above data of $\hat{m}$ as the orthogonal condition in equations (3) and (4), a maximum angle index of rotation is obtained as:

$$k_I = \left\lfloor \frac{-n_m}{2} \right\rfloor \quad (7)$$

wherein $\rfloor\ \rfloor$ means to access an integer downwards. For example, when $n_m=19$, $K_1=-10$, the accessible range is $\{-10,-11, \ldots -19\}$. Therefore, only infinitesimal angle rotation can be performed by this method.
Method 2

$$\hat{c}=1-2^{2k-1}, \hat{s}=2^k, \hat{m}=\sqrt{1+2^{4k-2}} \quad (8)$$

Four times of shift-addition are require for fast rotation. A maximum angle index of rotation is obtained as:

$$k_{II}\left\lfloor \frac{-n_m+2}{2} \right\rfloor > k_I \quad (9)$$

When $n_m=19$, $K_{II}=-5$, the accessible range is $\{-5, \ldots, -9\}$.
Method 3

$$\hat{c}=1-2^{2k-1}, \hat{s}=2^k-2^{3k-3}, \hat{m}=\sqrt{1+2^{6k-6}} \quad (10)$$

Six times of shift-addition are require for fast rotation. A maximum angle index of rotation is obtained as:

$$k_{III} = \left\lfloor \frac{-n_m+6}{6} \right\rfloor > k_{II} \quad (11)$$

When $n_m=19$, $K_{III}=-3$, the accessible range is $\{-3,-4\}$.

It is known from the above methods 1 to 3 that only by increasing the expansion orders of Taylor series to increase the range of rotation angle, the computing cost of rotation increases quickly. Therefore, another economic method is required.
Method 4

The rotation part of this method comprises continuous two fast rotations the angle index of k–1 in method 1. Therefore, method 4 is also called as "dual rotation method". The rotation parameters are $$\hat{c}=1^2-(2^{k-1})^2=1-2^{2k-2}$$

$$\hat{s}=2(2^{k-1})=2^2$$

$$\hat{m}=1+2^{2(k-1)} \quad (12)$$

wherein the scale factor is in a form of $1+x^2$. The formula "$(1-x^i)(1+x^i)=1-x^{2i}$" can be used to construct an additional scale factor $P_m$, so that $|P_m\hat{m}-1|$ quickly approaches to zero, and the total scale factor $P_m$ and $\hat{m}$ satisfies equation (4).

The additional scale factor is defined as $$P_m = \prod_{i=1}^{m} P_i,$$

wherein $m \geq 0$ is the calculation steps of the additional scale factor $P_i$. The parameters of $P_i$ are obtained from:

$$p_i = 1-2^{2(k-i)}$$

$$p_i = 1+2^{2i(k-1)}$$

$$i \geq 2 \quad (13)$$

According to equation (13), the total scale factor $P_m \hat{m}$ can be written as:

$$P_m \hat{m} = (1 + 2^{2(k-1)})(1 - 2^{2(k-1)})(1 - 2^{4(k-1)})\ldots(1 - 2^{2^m(k-1)})$$

$$= \left(1 - 2^{2^{(m-1)}(k-1)}\right)$$

Whereas the corresponding orthogonal conditions of equation (3) and (4) are:

$$2^{m+1}(k_{IV} - 1) \leq -(n_m + 1) \tag{14}$$

With the values of $n_m$ and m given by equation (14), the maximum of fast rotation angle index is:

$$k_{IV} = \left\lceil \frac{-(n_m + 1)}{2^{m+1}} \right\rceil \tag{15}$$

wherein $\lceil\ \rceil$ means to access an integer upwards. The more the operation steps of the added scale, the larger the available fast rotation angle is. Similar to this method, with given maximum rotation angle index $k_{IV}$ and $n_m$, the minimum operation steps of the additional scale m is:

$$m = \left\lfloor \log_2\left(\frac{-(n_m + 1)}{k_{IV} - 1}\right) \right\rfloor \tag{16}$$

The computing cost varies as the rotation angle. The dual rotation requires four shift-addition calculation. 2m shift-addition arithmetic are required for m operation steps of m additional scales. The total cost is 2m+4 shift-addition calculations.

For the above four methods the computing cost is different for different rotation angle. A fast rotation angle index set available for processor is constructed by the angle index set of these discrete angles. Table 1 shows the angle index set of fast rotation for $n_m$=19 (corresponding to a fixed-point processor with 20 digits) by using methods 1 to 4.

TABLE 1

Fast rotation angle index set by a fixed-point processor with 20 digits

| Angle notation | calculation | Angle (Arc) | Calculation cost (Shift-addition) | |
|---|---|---|---|---|
| k | method | $\alpha_k$ | Rotation | Scale |
| 0 | IV | 9.2730 × 10⁻¹ | 4 | 8 |
| −1 | IV | 4.8996 × 10⁻¹ | 4 | 6 |
| −2 | IV | 2.4871 × 10⁻¹ | 4 | 4 |
| −3 | III | 1.2508 × 10⁻¹ | 6 | 0 |
| −4 | III | 6.2510 × 10⁻² | 6 | 0 |
| −5 | II | 3.1255 × 10⁻² | 4 | 0 |
| −6 | II | 1.5626 × 10⁻² | 4 | 0 |
| −7 | II | 7.8126 × 10⁻³ | 4 | 0 |
| −8 | II | 3.9063 × 10⁻³ | 4 | 0 |
| −9 | II | 1.9531 × 10⁻³ | 4 | 0 |
| −10 | I | 9.7656 × 10⁻⁴ | 2 | 0 |
| −11 | I | 4.8828 × 10⁻⁴ | 2 | 0 |
| −12 | I | 2.4414 × 10⁻⁴ | 2 | 0 |
| −13 | I | 1.2207 × 10⁻⁴ | 2 | 0 |
| −14 | I | 6.1035 × 10⁻⁵ | 2 | 0 |
| −15 | I | 3.0518 × 10⁻⁵ | 2 | 0 |
| −16 | I | 1.5259 × 10⁻⁵ | 2 | 0 |
| −17 | I | 7.6294 × 10⁻⁶ | 2 | 0 |
| −18 | I | 3.8147 × 10⁻⁶ | 2 | 0 |
| −19 | I | 1.9073 × 10⁻⁶ | 2 | 0 |

2) Method of pre-rotating rotation range out of $-\pi/4 \sim \pi/4$ to a range therewithin.

Figure 2:
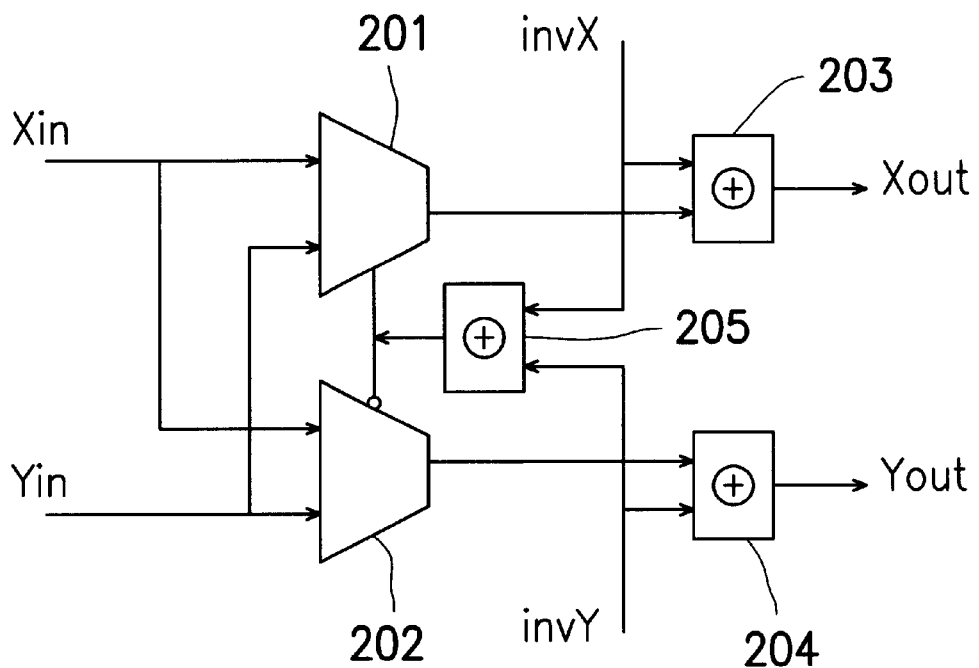
FIG. 2 shows the logic of fast rotation method 4 in an embodiment according to the invention.

It is known from equation (1) that when rotation angle is $-\pi/2$, $\pi/2$, or $\pi$, by simple permutation, an inverse operation can be obtain with a very low cost. Given an arbitrary angle and a pre-rotation of fast rotation angle in FIG. 1, the logic diagram of pre-rotation is shown as FIG. 2. In FIG. 2, the input data $X_{in}$ and $Y_{in}$ including four candidates are input into MUX 201 and MUX 202, respectively. Through the MUXs, two candidates of data are selected. Through the XOR gates, the rotation angle of the selected data is determined. It is obvious that the cost of pre-rotation is very low for only two multiplex (MUX) and exclusive OR (XOR) gates are required. The truth values are shown as Table 2.

TABLE 2

The truth values of pre-rotation logic

| Rotation Angle | Pre-rotation Angle | $X_{out}$ | $Y_{out}$ | InvX | InvY |
|---|---|---|---|---|---|
| [−π/4, π/4] | 0 | $X_{in}$ | $Y_{in}$ | 0 | 0 |
| [π/4, 3π/4] | π/2 | $-Y_{in}$ | $X_{in}$ | 1 | 0 |
| [−3π/4, −π/4] | −π/2 | $Y_{in}$ | $-X_{in}$ | 0 | 1 |
| [3π/4, 5π/4] | π | $-X_{in}$ | $-Y_{in}$ | 1 | 1 |

Hardware Implementation

In the invention, a pipeline technique is adapted. The advantages of the pipeline technique are:

1) The calculation throughput is enhanced: an appropriate pipeline design enables a convenient form of cascade (the output of the pipeline can be fed back to the input of the pipeline as required). The pipeline rotator can be used in different types of fast rotations. The critical path is determined by a single pipeline without being varied by the variation of pipeline depth, so that the operation speed is not influenced by the types of rotation.

2) The right-shift digits of a shifter are reduced: the right-shift digits of rotation input can be obtained in the pipeline through a few times of less right-shift digits, for example, $2^{2k-1} = 2^k \cdot 2^{k-1}$, $2^{3k-3} = 2^{2k-1} \cdot 2^{k-2}$, and so on. With the same structure of the pipelines in different orders, the time delay is uniform, so that the operation speed of the rotator is enhanced.

Figure 3:
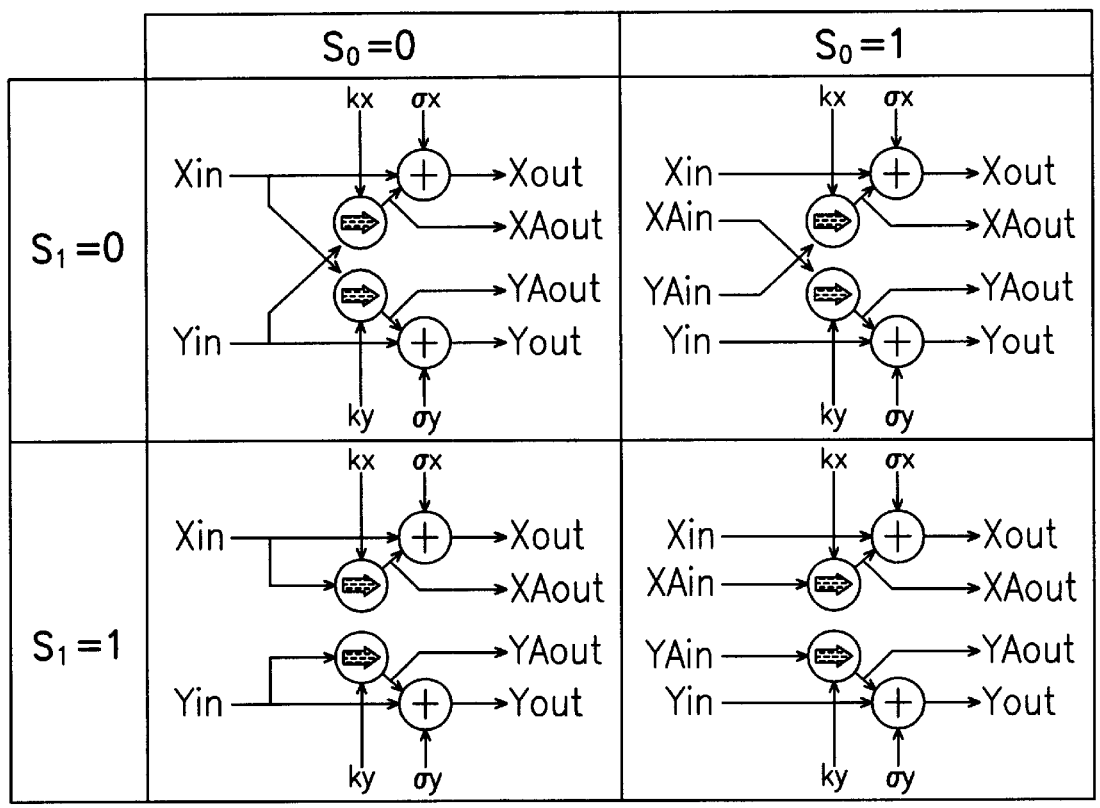
FIG. 3 shows rotator pipelines by four fast rotation methods and a conclusive form of these four pipelines in a embodiment according to the invention.
Figure 3:
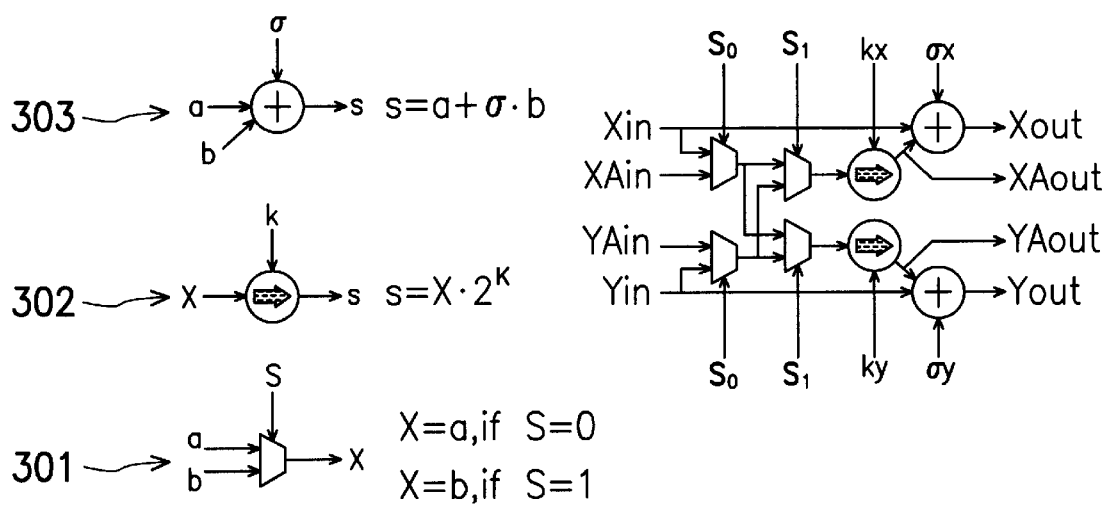

Referring to FIG. 3, rotator pipelines according to the above four methods and a conclusive form of these four pipelines are shown. Two sets of input data $X_{in}$, $Y_{in}$ and $X_{Ain}$ and $Y_{Ain}$ are filtered by MUXs 301. The controlling signal $S_0$ determines whether the pipeline stage is the first stage or the subsequent stage. The controlling signal $S_1$ determines whether a rotation operation or a scale operation is performed. Due to the symmetry characteristic, this pipeline structure can perform a fast rotation with an arbitrary angle. After the MUXs 301, two input data are selected. The selected input data are then fed into the shifter 302 to perform rotation multiplication. The rotation angle is determined by the controlling signal $k_x$, $k_y$, that is, the angle index. After fast rotation, the data are fed into adders/subtractors 303 for final computation, for addition or subtraction. The resultant data are then output through registers (not shown) from the adders/subtractors 303.

To minimize bubbles, that is, the idled pipelines, duration rotation, and to enhance the throughput, the number of serially connected pipelines has to be chosen properly. In the embodiment for a fixed-point processor of 20 digits according to the invention, four identical pipelines are chosen and connected in serial.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A fast rotator, used in performing Givens rotation, comprising: a plurality of multiplexes, for data filtering and selecting;

a plurality of shifters, to perform a fast rotation to data selected by the multiplexes; and a plurality of adders/subtractors, to complete computation after the fast rotation and to obtain a resultant data, wherein the fast rotation is defined as $$F(\hat{c}, \hat{s}) = \begin{bmatrix} \hat{c} & -\sigma\hat{s} \\ \hat{s} & \hat{c} \end{bmatrix} = \hat{m}G(\theta),$$

wherein $\sigma=\pm1$ represents a counterclockwise rotation and a clockwise rotation, respectively, a parameter pair $(\hat{c},\hat{s})$ is a sine/cosine approach of $(c,s)$, respectively, and $\hat{m}$ is a scale factor:

$$\hat{m} = \sqrt{\hat{c}^2 + \hat{s}^2} = 1 + \epsilon,$$

while $\epsilon$ is sufficiently small, $F(\hat{c},\hat{s})$ can precisely represent a Givens rotation $G(\theta)$.

2. The apparatus according to claim 1, wherein a plurality of registers are further comprised for input/out of the resultant data.

3. The apparatus according to claim 1, wherein the fast rotation is performed according to four methods, which comprises the first method, the second method, the third method, and the fourth method, of cosine/sine Taylor series expansion within $-\pi/4 \sim \pi/4$.

4. The apparatus according to claim 3, wherein in the first method, for k is an angle index of rotation:

$$\hat{c}=1, \hat{s}=2^k, \hat{m}=\sqrt{1+2^{2k}} \text{ and}$$

$$k_I = \left\lfloor \frac{-n_m}{2} \right\rfloor.$$

5. The apparatus according to claim 3, wherein in the second method, for k is an angle index of rotation:

$$\hat{c}=1-2^{2k-1}, \hat{s}=2^k, \hat{m}=\sqrt{1+2^{4k-2}} \text{ and}$$

$$k_{II} = \left\lfloor \frac{-n_m+2}{2} \right\rfloor > k_I.$$

6. The apparatus according to claim 3, wherein in the third method, for k is an angle index of rotation:

$$\hat{c}=1-2^{2k-1}, \hat{s}=2^k-2^{3k-3}, \hat{m}=\sqrt{1+2^{6k-6}} \text{ and}$$

$$k_{III} = \left\lfloor \frac{-n_m+6}{6} \right\rfloor > k_{II}.$$

7. The apparatus according to claim 3, wherein in the fourth method, for k is an angle index of rotation, $P_i$ is the additional scale factor, and m is the calculation steps of $P_i$:

$$\begin{cases} \hat{c} = 1^2 - (2^{k-1}) = 1 - 2^{2k-2} \\ \hat{s} = 2(2^{k-1}) = 2^k \\ \hat{m} = 1 + 2^{2(k-1)}. \end{cases}$$

$$p_i = 1 - 2^{2^i(k-1)}$$
$$p_i = 1 + 2^{2^i(k-1)}$$
$$i \geq 2$$

$$P_m\hat{m} = (1+2^{2(k-1)})(1-2^{2(k-1)})(1-2^{4(k-1)})\ldots(1-2^{2^m(k-1)})$$

$$= (1-2^{2^{(m-1)}(k-1)}),$$

$$2^{m+1}(k_{IV}-1) \leq -(n_m+1),$$

$$k_{IV} = \left\lceil \frac{-(n_m+1)}{2^{m+1}} \right\rceil, \text{ and with } m = \left\lfloor \log_2\left(\frac{-(n_m+1)}{k_{IV}-1}\right) \right\rfloor:$$

$$k_{IV} = \left\lceil \frac{-(n_m+1)}{2^{m+1}} \right\rceil.$$

8. The apparatus according to claim 1, wherein the fast rotation is performed according to a pre-rotation method to convert a rotation angle out of a range of $-\pi/4 \sim \pi/4$ to a rotation angle therewithin.

9. An apparatus of fast rotation, used in performing Givens rotation, including a plurality of pipelines, wherein each of the pipelines comprises: a plurality of multiplexes, for data filtering and selecting;

a plurality of shifters, to perform fast rotation of data selected by the multiplexes; and a plurality of adders/subtractors, to complete computation after the fast rotation and to obtain a resultant data, wherein the fast rotation is defined as $$F(\hat{c}, \hat{s}) = \begin{bmatrix} \hat{c} & -\sigma\hat{s} \\ \hat{s} & \hat{c} \end{bmatrix} = \hat{m}G(\theta),$$

wherein $\sigma=\pm1$ represents a counterclockwise rotation and a clockwise rotation, respectively, a parameter pair $(\hat{c},\hat{s})$ is a sine/cosine approach of $(c,s)$, respectively, and $\hat{m}$ is a scale factor:

$$\hat{m} = \sqrt{\hat{c}^2+\hat{s}^2} = 1\epsilon,$$

while $\epsilon$ is sufficiently small, $F(\hat{c},\hat{s})$ can precisely represent a Givens rotation $G(\theta)$.

10. The apparatus according to claim 9, wherein a plurality of registers are further comprised in each pipeline for input/out of the resultant data.

11. The apparatus according to claim 9, wherein the fast rotation is performed according to four methods of cosine/sine Taylor series expansion within $-\pi/4 \sim \pi/4$.

12. The apparatus according to claim 11, wherein the four methods comprises method 1, method 2, method 3, and method 4.

13. The apparatus according to claim 12, wherein in method 1, for k is an index angle of rotation:

$$\hat{c}=1, \hat{s}=2^k,$$

$$\hat{m} = \sqrt{1+2^{2k}} \text{ and } k_I = \left\lfloor \frac{-n_m}{2} \right\rfloor.$$

14. The apparatus according to claim 12, wherein in method 2, for k is an index an angle of rotation:

$$\hat{c}=1-2^{2k-1}, \hat{s}=2^k, \hat{m}=\sqrt{1+2^{4k-2}} \text{ and}$$

$$k_{II} = \left\lfloor \frac{-n_m+2}{2} \right\rfloor > k_I.$$

15. The apparatus according to claim 12, wherein in method 3, for k is an index angle of rotation:

$$\hat{c}=1-2^{2k-1}, \hat{s}=2^k-2^{3k-3}, \hat{m}=\sqrt{1+2^{6k-6}} \text{ and}$$

$$k_{III} = \left\lfloor \frac{-n_m+6}{6} \right\rfloor > k_{II}.$$

16. The apparatus according to claim 12, wherein in method 4, for k is an index angle of rotation. $P_i$ is the additional scale factor, and m is the calculation steps of $P_i$.

$$\begin{cases} \hat{c} = 1^2 - (2^{k-1})^2 = 1 - 2^{2k-2} \\ \hat{s} = 2(2^{k-1}) = 2^k \\ \hat{m} = 1 + 2^{2(k-1)} \end{cases},$$

$p_i = 1 - 2^{2(k-1)}$ $p_i = 1 + 2^{2i(k-1)}$ $i \geq 2$ $$P_m \hat{m} = (1 + 2^{2(k-1)})(1 - 2^{2(k-1)})(1 - 2^{4(k-1)}) \cdots (1 - 2^{2^m(k-1)}),$$
$$= (1 - 2^{2^{(m+1)}(k-1)})$$

$2^{m+1}(k_{IV} - 1) \leq -(n_m + 1),$ $k_{IV} = \left\lceil \frac{-(n_m+1)}{2^{m+1}} \right\rceil$, and with $m = \left\lfloor \log_2\left(\frac{-(n_m+1)}{k_{IV}-1}\right) \right\rfloor$:

$k_{IV} = \left\lceil \frac{-(n_m+1)}{2^{m+1}} \right\rceil.$

17. The apparatus according to claim 9, wherein the fast rotation is performed according to a pre-rotation method to convert a rotation angle out of a range of $-\pi/4 \sim \pi/4$ to a rotation angle therewithin.

18. The apparatus according to claim 9, wherein four pipelines are included.

19. A method of fast rotation, used in performing Givens rotation, wherein a pipeline comprising a plurality of multiplexes, a plurality of shifters, to perform fast rotation of data selected by the multiplexes, and a plurality of adders/subtractors is provided, comprising:

inputting a plurality sets of data to be filtered and selected by the multiplexes;

performing fast rotation to the data selected by the multiplexes; and performing a final computation and outputting a set of resultant data through the adders/subtractors, wherein the fast rotation is defined as $$F(\hat{c}, \hat{s}) = \begin{bmatrix} \hat{c} & -\sigma\hat{s} \\ \hat{s} & \hat{c} \end{bmatrix} = \hat{m}G(\theta),$$

wherein $\sigma=\pm1$ represents a counterclockwise rotation and a clockwise rotation, respectively, a parameter pair $(\hat{c},\hat{s})$ is a sine/cosine approach of $(c,s)$, respectively, and $\hat{m}$ is a scale factor:

$$\hat{m}=\sqrt{\hat{c}^2+\hat{s}^2}=1\epsilon,$$

while $\epsilon$ is sufficiently small, $F(\hat{c},\hat{s})$ can precisely represent a Givens rotation $G(\theta)$.

20. The method according to claim 19, wherein the set of resultant data are output to a plurality of registers.

21. The apparatus according to claim 19, wherein the fast rotation is performed according to four methods of cosine/sine Taylor series expansion within $-\pi/4$ symbol$\sim\pi/4$.

22. The method according to claim 21, wherein the four methods comprises a method 1, a method 2, a method 3, and a method 4.

23. The method according to claim 21, wherein in the method 1, for k is an index angle of rotation:

$$\hat{c}=1, \hat{s}=2^k, \hat{m}=\sqrt{1+2^{2k}} \text{ and}$$

$$k_I = \left\lfloor \frac{-n_m}{2} \right\rfloor.$$

24. The method according to claim 21, wherein in the method 2, for k is an index angle of rotation:

$$\hat{c}=1-2^{2k-1}, \hat{s}=2^k, \hat{m}=\sqrt{1+2^{4k-2}} \text{ and}$$

$$k_{II} = \left\lfloor \frac{-n_m+2}{2} \right\rfloor > k_I.$$

25. The method according to claim 21, wherein in the method 3, for k is an index angle of rotation:

$$\hat{c}=1-2^{2k-1}, \hat{s}=2^k-2^{3k-3}, \hat{m}=\sqrt{1+2^{6k-6}} \text{ and}$$

$$k_{III} = \left\lfloor \frac{-n_m+6}{6} \right\rfloor > k_{II}.$$

26. The method according to claim 21, wherein in the method 4, for k is an angle index of rotation, $P_i$ is the additional scale factor, and m is the calculation steps of $P_i$:

$$\begin{cases} \hat{c} = 1^2 - (2^{k-1})^2 = 1 - 2^{2k-2} \\ \hat{s} = 2(2^{k-1}) = 2^k \\ \hat{m} = 1 + 2^{2(k-1)} \end{cases},$$

$p_i = 1 - 2^{2(k-1)}$ $p_i = 1 + 2^{2i(k-1)}$ $i \geq 2$ $$P_m \hat{m} = (1 + 2^{2(k-1)})(1 - 2^{2(k-1)})(1 - 2^{4(k-1)}) \cdots (1 - 2^{2^m(k-1)}),$$
$$= (1 - 2^{2^{(m+1)}(k-1)})$$

$2^{m+1}(k_{IV} - 1) \leq -(n_m + 1),$ $k_{IV} = \left\lceil \frac{-(n_m+1)}{2^{m+1}} \right\rceil$, and with $m = \left\lfloor \log_2\left(\frac{-(n_m+1)}{k_{IV}-1}\right) \right\rfloor$:

$k_{IV} = \left\lceil \frac{-(n_m+1)}{2^{m+1}} \right\rceil.$

27. The method according to claim 19, wherein the fast rotation is preformed according to a pre-rotation method to convert a rotation angle out of a range of $-\pi/4 \sim \pi/4$ to a rotation angle therewithin.

* * * * *